US012645628B2

(12) United States Patent    (10) Patent No.:   US 12,645,628 B2

Erler et al.    (45) Date of Patent:   Jun. 2, 2026

(54) METHOD AND SYSTEM FOR DATA TRANSACTIONS ON A COMMUNICATIONS INTERFACE

(71) Applicant: Ampere Computing LLC, Santa Clara, CA (US)

(72) Inventors: Matthew Robert Erler, Portland, OR (US); Robert James Safranek, Portland, OR (US); Robert Joseph Toepfer, Portland, OR (US); Sandeep Brahmadathan, Dublin, CA (US); Shailendra Ramrao Chavan, Brentwood, CA (US); Jonglih Yu, Sunnyvale, CA (US)

(73) Assignee: Ampere Computing LLC, Santa Clara, CA (US)

( * ) Notice: Subject to any disclaimer, the term of this patent is extended or adjusted under 35 U.S.C. 154(b) by 177 days.

(21) Appl. No.: 17/349,588

(22) Filed: Jun. 16, 2021

(65) Prior Publication Data

US 2022/0405223 A1    Dec. 22, 2022

(51) Int. Cl.
| | |
|---|---|
| *G06F 13/20* | (2006.01) |
| *G06F 11/10* | (2006.01) |
| *G06F 13/40* | (2006.01) |
| *G06F 13/42* | (2006.01) |

(52) U.S. Cl.
CPC ...... *G06F 13/4022* (2013.01); *G06F 11/1004* (2013.01); *G06F 13/4068* (2013.01); *G06F 13/4221* (2013.01); *G06F 2213/0026* (2013.01); *G06F 2213/0038* (2013.01)

(58) Field of Classification Search
CPC .. G06F 13/00; G06F 13/4022; G06F 11/1004; G06F 13/4068; G06F 13/4221; G06F 2213/0026; G06F 2213/0038
See application file for complete search history.

(56) References Cited

U.S. PATENT DOCUMENTS

| | | | |
|---|---|---|---|
| 7,712,006 B1 | 5/2010 | Miller | |
| 8,738,860 B1 * | 5/2014 | Griffin | G06F 12/0897 |
| | | | 711/122 |
| 9,298,659 B2 * | 3/2016 | Gregg | G06F 13/36 |
| 11,301,408 B1 * | 4/2022 | Friedman | G06F 13/4072 |

(Continued)

*Primary Examiner* — Henry Tsai

*Assistant Examiner* — Kim T Huynh

(74) *Attorney, Agent, or Firm* — Muncy, Geissler, Olds & Lowe, P.C.

(57) ABSTRACT

A system-on-a-chip (SoC) with one or more processors and other system components may have one or more peripheral component interconnect express (PCIe) physical connections between the processors and other system components to provide agent-to-agent communication. The agents on the communication fabric of the SoC may transmit data through the hardware PCIe interface where a transmitter device of an agent or digital logic component receives at least one data block for transmission and receives a flag corresponding to the at least one data block. The transmitter device may then send, via a PCIe physical layer, the received data blocks as a payload of a packet based on the flag, where the packet has a PCIe compliant header. The payload of the packet with the PCIe header may be entirely composed of these data blocks or flits from the agent.

20 Claims, 5 Drawing Sheets

(56) References Cited

U.S. PATENT DOCUMENTS

| | | | |
|---|---|---|---|
| 2009/0037617 A1* | 2/2009 | Riley ................... | G06F 13/387 |
| | | | 710/36 |
| 2011/0082949 A1* | 4/2011 | Matthews ........... | G06F 13/4027 |
| | | | 710/1 |
| 2015/0134880 A1* | 5/2015 | Danilak .............. | G06F 13/4282 |
| | | | 711/103 |
| 2015/0248363 A1* | 9/2015 | Dumoulin .............. | G06F 13/28 |
| | | | 710/308 |
| 2016/0231939 A1* | 8/2016 | Cannata ................ | G06F 3/0605 |
| 2019/0108124 A1* | 4/2019 | Das Sharma ....... | G06F 13/1673 |
| 2020/0192853 A1* | 6/2020 | Caruk ................ | G06F 13/1689 |

* cited by examiner

| Header 402 | Payload Messages 404 | CRC 406 |
|------------|----------------------|---------|

| Header 402 | | Payload 408 | | | | CRC 406 |
|------------|------|-------------|------|------|------|---------|
| 40 | 42 | 52 | 54 | 56 | 58 | 60 |
| | 44 | | | | | |

Receive a flag corresponding to at least one data block

504

Receive at least one data block for transmission

506

Send, via a PCIe physical layer, the at least one data block as a payload of a first packet based on the flag, the first packet having a PCIe compliant header

METHOD AND SYSTEM FOR DATA TRANSACTIONS ON A COMMUNICATIONS INTERFACE

BACKGROUND

I. Field of the Disclosure

The technology of the disclosure relates generally to data block conversion on a system-on-chip (SoC), and specifically to the packaging of data into packets.

II. Background

Until recently, most central processor units had a small number of processor cores and other components. On smaller semiconductor dies the hosting of only a few processor cores allows for more direct communication. This direct communication includes the transmission of data blocks with minimal routing overhead.

In conventional implementations, a mesh interconnect between processor cores may operate on a broadcast-all or serial communication protocol. That is, each node on the mesh of the processor fabric is provided with a packet or a chain of nodes pass along the packet until the appropriate node is reached. With minimal routing information, such communications quickly become inefficient after more than a few instances of packet forwarding. Since the semiconductor dies for systems on a chip now may have in excess of 120 processor cores, the repeated forwarding of packets is inefficient for such systems. The need for more and more processor cores with continued access to a mesh interconnect between them has created a need for a more direct communication method.

On the other hand, the peripheral component interconnect express (PCIe) protocol, which is conventionally used to communicate with peripherals (e.g., random access memory), may be fast and direct, but the overhead and inflexibility of its primary data blocks (called messages) make it ill-suited for agent-to-agent communication between processors via a fabric. In such an implementation, low latency and flexibility are needed. Other interfaces and protocols such as inter-integrated circuit (I2C) or serial peripheral interface (SPI) are too slow to provide usable communication rates. Accordingly, the present invention may address deficiencies in the conventional implementations.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example implementation, a system-on-a-chip (SoC) with one or more processors and other system components may have one or more peripheral component interconnect express (PCIe) physical connections between the processors and other system components to provide agent-to-agent communication. The agents on the communication fabric of the SoC may transmit data through the hardware PCIe interface where a transmitter device of an agent (digital logic components) receives at least one data block for transmission and receives a flag corresponding to the at least one data block. The transmitter device may then send, via a PCIe physical layer, the at least one data block as a payload of a packet based on the flag, where the packet has a PCIe compliant header. The payload of the packet with the PCIe header may be entirely composed of these data blocks from the agent.

In addition, these packets may be transmitted over PCIe physical interfaces between agents on the SoC fabric even though the payload of the packets does not comply with PCIe, and specifically, the protocol layer requirements of PCIe communications. The flag received by the transmitter device may define a cycle such that, during the cycle, any data blocks of the at least one data block received are added to the payload of a packet. These data blocks which are incorporated into the payload of the packet may be a flow control unit (FLIT). The flag may be a flitvalid input which indicates the continued existence of a communication channel or path between agent components and indicates further data blocks are to be expected along that path. The packet may also include a cyclical redundancy check (CRC) or other data check code at a tail end of the packet. This CRC check may also comply with the PCIe transaction and/or link layers.

A first block of the data blocks input to the transmitter device may be a head flit, the head flit may define a routing path and setting the flag to valid, then at least one second block may be a data flit, the first block and the second blocks may be sent in the payload. Indeed, the payload may be made up of only flits. This preserves the routing features of the flit-based communication pathway so that the pathway may be re-initiated upon the packet being decoded at a receiver. For instance, upon decoding at a receiver, the head flit of the first block may define an output flag of the receiver. On the transmitter side, upon the flag being de-asserted, assembly of the payload of the packet is finished and the packet may be sent.

In other words, the size of the payload may be defined by the flag status or by settings at the receiver such as latency requirements or transmission windows. Specifically, the size of the payload may be determined based on a latency requirement, and for the payload a routing cycle may be defined based on the flag. Based on the size of the payload, which is based on the latency requirement, the transmitter may send, as the payload, a portion of received data blocks that are received during the routing cycle. That is, not all of the flits received during a single cycle may be sent in a single packet. As noted above, the sizing of the payload may alternatively be sized to fit all flits in a single cycle. Furthermore, the payload may contain multiple cycles of flits and one or more head flits.

These features allow for flit generating hardware such as processor cores to communicate via flits which are encapsulated in packets with PCIe headers and are sent over PCIe compliant physical layers. Upon receipt the flits may then be used by the receiving agent as though received over a flit-based physical layer. Thus, the PCIe hardware provides the benefits of accelerated and intelligent routing while simultaneously being invisible to the agents communicating via flits.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

BRIEF DESCRIPTION OF THE DRAWINGS

FIG. 4A is a diagram of a PCIe packet according to an implementation;

FIG. 4B is a diagram of a packet with a flit-based payload according to an implementation.

DETAILED DESCRIPTION

Figure 1:
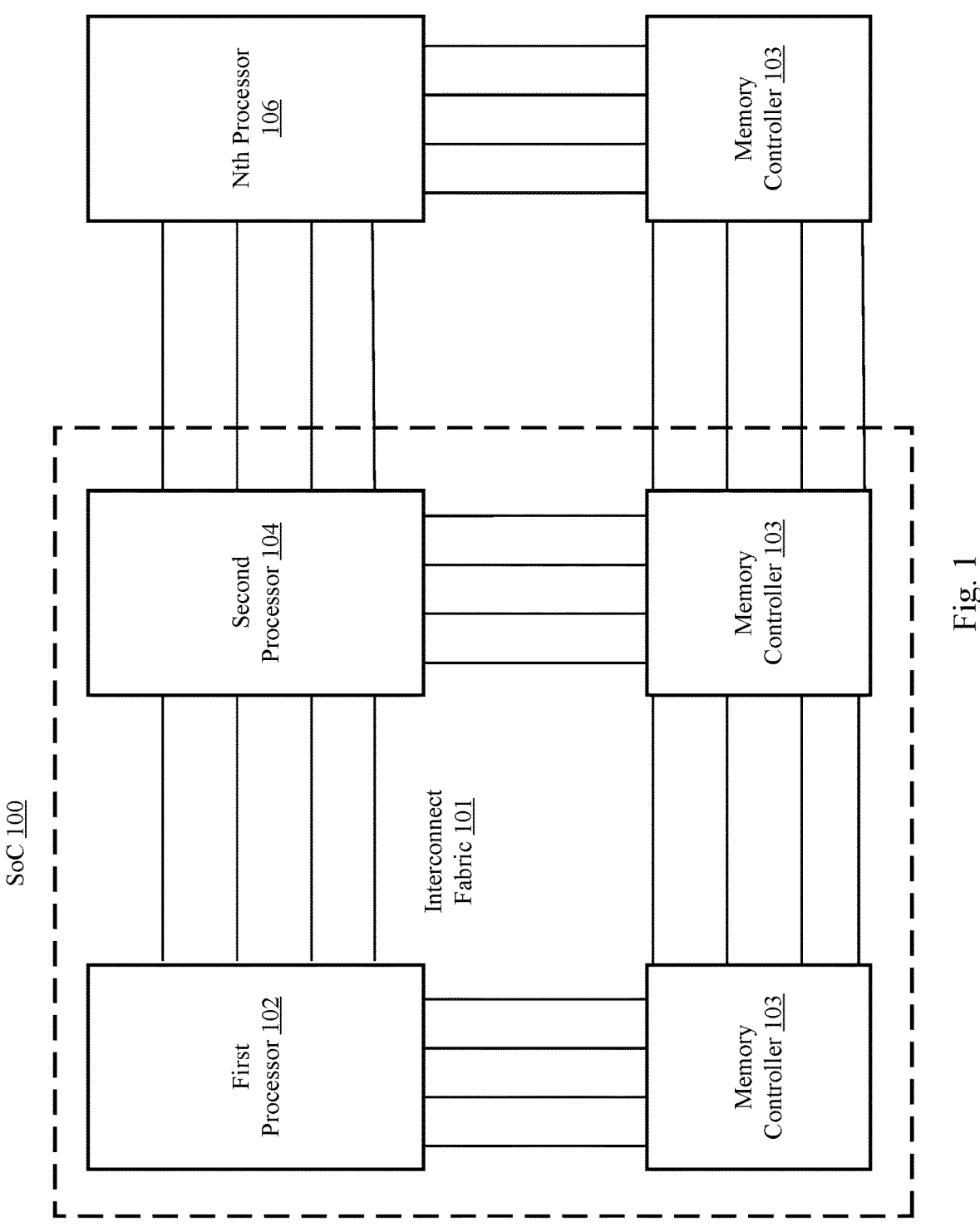
FIG. 1 is a schematic block diagram of various components of a system-on-a-chip according to an implementation.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

The word "exemplary" is used herein to mean "serving as an example, instance, or illustration." Any implementation described herein as "exemplary" is not necessarily to be construed as preferred or advantageous over other embodiments. Likewise, the term "implementation" does not require that all implementations include the discussed feature, advantage, or mode of operation.

The terminology used herein describes particular implementations only and should not be construed to limit any implementations disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Various components as described herein may be implemented as application specific integrated circuits (ASICs), programmable gate arrays (e.g., FPGAs), firmware, hardware, software, or a combination thereof. Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to", "instructions that when executed perform", "computer instructions to" and/or other structural components configured to perform the described action.

Those of skill in the art will further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The diagram of FIG. 1 illustrates a number of processors including first processor 102, a second processor 104 to Nth processor 106. One or more of these processors may be disposed on a large semiconductor die or wafer which includes system-on-a-chip (SoC) 100. In FIG. 1 the SoC 100 is illustrated with processors 102 and 104 and their respective memory controllers 103 on the semiconductor die of SoC 100. The SoC 100 may include over one hundred (100) such processor cores distributed over the semiconductor wafer. The processors 102, 104, and 106 may communicate with memory controllers 103 and with each other via a fabric 101 which connects each of these components via one or more physical/electrical communication lines.

The Nth processor 106 and its memory controller 103 may be disposed off of the SoC chip and connected to on-chip processors and memory controllers 103 via electrical lines. The processors 102 and 104 and memory controllers 103 on the SoC 100 may communicate with the Nth processor 106 and its memory controller 103 in the same way via the fabric interconnect 101. The communication between on-chip processors and components and those hardware components off-chip or on a separate semiconductor die may utilize the same protocols described herein.

In an implementation such as on a multi-core SoC 100, the SoC 100 may include various hardware components or intellectual property (IP) components (e.g., processors, controllers, buses, bridges, etc.) which may be called agents. The communication of an agent with another agent may include one or more agent-to-fabric communications and one or more fabric-to-agent communications. For example, if the first processor 102 were to send a data block or flit to Nth processor 106, the flit may pass through a number of agents or processors (e.g., second processor 104) in series between the first processor 102 and the Nth processor 106. Thus, each of the hardware components or agents (e.g., first processor 102 or memory controller 103) may operate as router nodes in a mesh interconnect between agents. The mesh interconnect interface may include hardware and protocol layers which may collectively be called fabric 101.

The mesh interconnect may also transport memory requests to and from memory controllers 103. The components of the SoC 100 may each include a node capable of generating or processing coherent memory requests. In order to maintain coherency of a shared memory or collection of memories in such a system, it is desirable to have a global ordering of requests. While systems have been able to do so with a notification network between the nodes when a coherent memory request has been made by a node, it is possible that a single node can broadcast multiple requests which are to be snooped by other nodes in the data processing system. Each node of the fabric 101 may include one or more conductors depending on the number of bits needed within the network. For example, a notification network and multiple request network may be a single bit network, and a multiple request count network may be an n-bit network, where n corresponds to an integer value of one or more needed to encode a count or index value. In alternate implementations, any type of interconnect formation may be used, such as any size array or grouping, or other forms of mesh interconnects such as a cross-bar switch, a ring interconnect, a point-to-point mesh fabric, a mesh with diagonal interconnects, etc. The mesh interconnect network may be a broadcast-based network (e.g., multi-cast). One or more nodes or hardware components (e.g., processors 102/104/106 and memory controllers 103) with nodes may include routing interfaces and encoding decoding logic for handling packets with header and tail features designed according to the PCIe link layer and/or transaction layer.

In particular, between the first processor 102, the second processor 104, and other components four separate electrical connections are illustrated. Each of the components may connect via four or more connections, including diagonally (although not illustrated), with each connection forming a PCIe physical layer. In use cases with higher bandwidth requirements, more PCIe lanes may be added. In addition, power connections, clock signal connections, test connections, and grounding connection may be included in the PCIe communication connections illustrated. The technical specifications of PCIe 3.0, 4.0, and 5.0 are each hereby incorporated by reference in their entirety. These physical connections may be formed under any of the technical specifications of the PCI, PCI-X, and PCIe interfaces (e.g., 1.0, 2.0, 3.0, 4.0, 5.0, and other decimal iterations in between).

The connections forming fabric 101 may include a physical layer in compliance with one of the PCIe specifications. The physical layer may have both transmit and receive paths for each connection. The physical layer may also perform a number of operations on data received from the link layer before transmitting the data over the physical connection. These operations may include packet framing and encoding. Likewise, on the receiving side, the physical layer may perform extraction and decoding of the physical layer data. The electrical logic of the physical layer may perform additional actions or operations on the received electrical signals including de-skewing, clock signal extraction, and serial/parallel conversion. The electrical logic may also contain and manage the transmit and receive buffers.

The connections forming fabric 101 may include a physical layer in compliance with one of the PCIe specifications noted above. Furthermore, the fabric 101 may include the data link layer which may establish links, manage links, and inform transmitters or receivers of failed/successful transmissions (e.g., ACK, NAK). The data link layer keeps track of the link status between a PCIe interface and a core device via a state machine. The state machine may have the following parameters: States (DL_Inactive, DL_Init and DL_Active) Status Outputs (DL_Down and DL_Up). Data link layer packets (DLLPs) may support link operations and may only be associated with that given link. DLLPs originate in the link layer and may be differentiated from transaction layer packets (TLPs) when passed between the link layer and the physical layer. Additionally, TLPs may have an originator and destination that are not necessarily linked directly in the link layer. In contrast, a DLLP may only be intended for the device on the other side of the established link.

Within a processor core (e.g., Nth processor 106) another data structure and protocol may be used which are flow control units or flits (also called fabric packets). These flits may also be transmitted directly over electrical connections (which may be separate from the PCIe connections) between hardware components of the SoC 100. The protocol may operate by establishing a dedicated virtual channel between two elements and/or a dedicated physical connection for one or more clock cycles using a leading notification/request to the receiver and a flag to hold the connection live and dedicated. The flag may be a flit_valid bit stored on a register until cleared or a port/input that is asserted/de-asserted. While the flag is valid and after the pathway (virtual/physical) is established, all data blocks or flits transmitted over a separate line are from the same linked transmitting device or logic element. These flits have minimal overhead but consume silicon area and power with their dedicated transmissions pathways. Additional features of the flit communication protocol may be found in U.S. Pat. No. 7,712, 006 which is herein incorporated by reference in its entirety.

Further applicability of these protocols and processes will be described with respect to the following figures.

Figure 2:
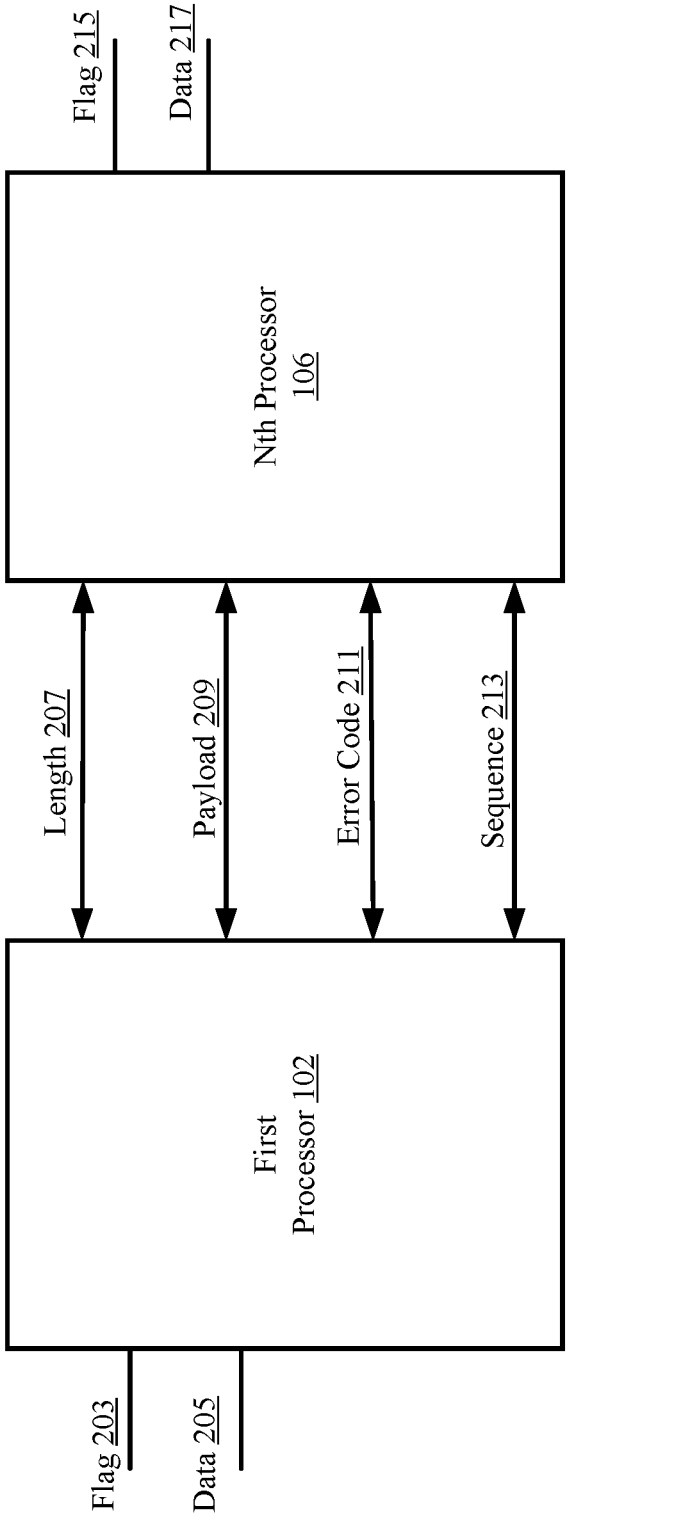
FIG. 2 is a schematic block diagram of connections between two processors of the system-on-a-chip according to an implementation.

In FIG. 2, the first processor 102 and the Nth processor 106 may be hardware components as illustrated in FIG. 1. The four electrical connections of FIG. 1 may be those illustrated in FIG. 2, specifically, a length line 207, a payload line 209, an error or data check line 211, and a sequence line 213. The first processor 102 and Nth processor 106 may each have one or more transmitters and one or more receivers that operate or communicate over the four lines 207, 209, 211, and 213. Since each of the processors may have both receivers and transmitters, the four lines are illustrated as bi-directional communication as the communication may originate at either the first processor 102 or the Nth processor 106. The bi-directional communication may occur over separate uni-directional lines for each of the four lines 207, 209, 211, and 213 for respective transmitters at each processor. Additional lines or substantial duplicates of the four illustrated may be provided for additional transmitters/receivers of the respective devices. Likewise, connection lines may be shared by transmitters/receivers as defined in the PCIe interface specification.

The first processor 102 and the Nth processor 106 may have one or more other hardware components disposed in between each other (e.g., second processor 104) such that signals along the connecting lines may pass through the other components in between. For such cases where data must be sent across a semiconductor die through several other hardware components for which the data is not the intended recipient, the additional routing features of the PCIe transaction layer provide efficiency over simpler flit-based agent-to-agent communication.

Accordingly, the first processor 102 may receive one or more flits at first and second input lines 203 and 205, respectively. The first processor 102 may then package the flits into modified transaction layer packets (TLPs), which are described further with respect to FIG. 4B, for long distance travel across other components to the Nth processor 106. Upon reaching the Nth processor 106, the flits may then be unpacked from the packet and used according to the flit communication protocol. Likewise, the flits may be generated according to processes within the first processor 102 or Nth processor 106 and transmitted to the Nth processor 106 or the first processor 102, respectively, via these packets.

The length line 207 may communicate a length of a transaction layer packet from the header of the packet, the length being defined in terms of bits, bytes, blocks, or clock cycles, for example. The payload line 209 may transport the data in the payload of the transaction layer packet. Additional payload lines may be included to increase the speed of transmission of the payload. The error code line 211 may carry the data checks (e.g., CRC) of the transaction layer packet and acknowledgements (ACK) or negative-acknowledgements (NAK) from downstream receivers. The sequence line 213 may carry an index or series of indices that describe ordering of data blocks between payloads of different packets and/or within a payload of a packet. These connections are defined in more detail with respect to FIG. 3 below.

Figure 3:
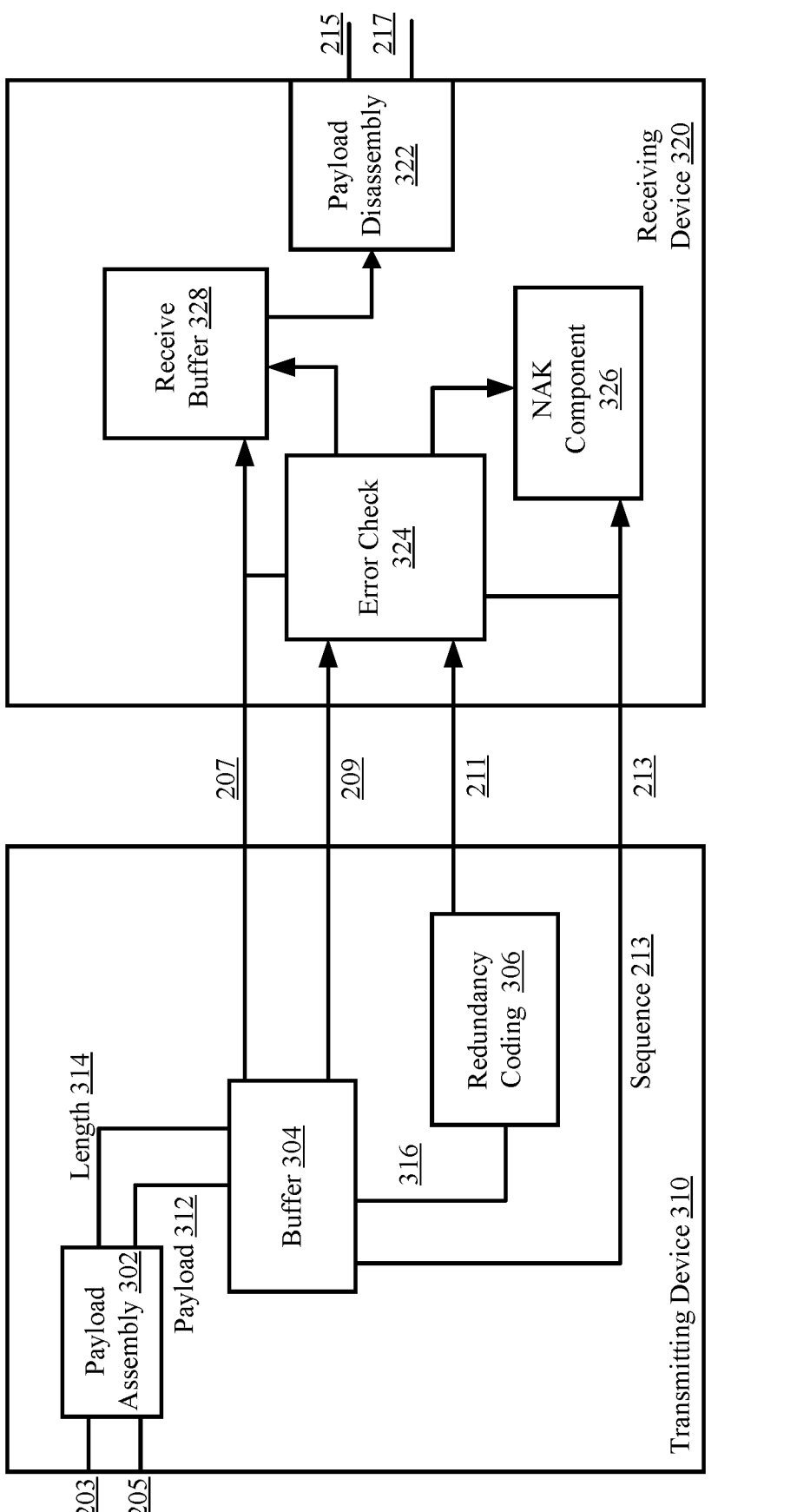
FIG. 3 is a schematic block diagram of connections between a transmitter and receiver of respective agent components on the system-on-a-chip according to an implementation.

In FIG. 3 one direction of the communication between the two hardware components of the SoC 100 is illustrated as communication from a transmitter device 310 to a receiver device 320. The components that enable communication across electrical connections 207, 209, 211, and 213 are illustrated. In addition, these components may package flits into TLPs or extract flits from TLPs, as the case may be, so as to encapsulate one transmission packet into the payload of a larger packet according to parts of the PCIe protocol. At first input 203, the transmitter device 310 may receive one or more data blocks which may be structured as flit flags or header flits. At second input 205, the transmitter device may receive data blocks or flits that contain the data to be transmitted. These are assembled into a payload or data blocks for a TLP payload at a payload assembly component 302.

The payload assembly component 302 may be a buffer or one or more registers that allows the transmitter to collect the received data block fully and determine the length of the received data block. The payload assembly component 302 may include ACK or NAK components for response to a transmitter of the flits received at inputs 203 and 205. The payload assembly component 302 may additionally perform other actions such as correcting minor sequencing issues such as dropped flits, corrupted flits, or delayed flits which may have taken other routes through nodes of the fabric 101. After building a payload over a complete cycle of the flit interface, for example, the payload assembly component 302 outputs payload 312 and length 314 of the payload to buffer 304. The transmitter device 310 does not convert the received flit or data block into a PCIe message that would comply with the PCIe protocol layer.

The buffer 304 or replay buffer may further compile the payload and may sequence one or more payloads from related transmissions for more efficient transmission over the PCIe physical layer. That is, payload assembly 302 and buffer 304 may perform operations to re-order and compose received data blocks or flits into a payload that can be transmitted over the PCIe interface. The buffer 304 may assign sequence numbers to payloads received from the payload assembly 302. One or more of these sequence numbers or index numbers within the buffer 304 may be sent along with the payload via sequence line 213. The sequence number is also sent to the redundancy coding component 306 via connection 316.

In addition to the sequence numbers, the buffer 304 provides the redundancy coding component 306 with the length of the various payloads corresponding to the sequence numbers and provides the payloads corresponding to the sequence numbers. The redundancy coding component 306 produces a hash or other data summary (e.g., parity bits) based on the received length, sequence number, and payload. The redundancy coding may be a cyclical redundancy check (CRC) of the entire header and payload to be transmitted. In addition, the redundancy coding component 306 may generate a separate redundancy code block for the header of the packet (e.g., framing token redundancy code—FCRC).

The redundancy code may be transmitted over error code line 211 alongside the length data over length line 207, the sequence numbers over sequence line 213, and the packet payload over payload line 209. Together the length, the sequence number, the FCRC, the redundancy code, and the payload of flits may make up the packet which complies with the physical, electrical, and data link layers of the PCIe specification. Indeed, the transmission lines 207, 209, 211, and 213 may be connected to a single data link port at the transmitting device 310 and the receiving device 320. The packet may comply with the transaction layer of PCIe, but does not comply with the protocol layer of PCIe since none of the data blocks or flits that compose the payload are valid PCIe messages.

At the receiving device 320, the error check component 324 receives each element of the packet including the sequence number via sequence line 213, the packet length via length line 207, the CRC data via error code line 211, and the payload via payload line 209. The error check then compares the redundancy code generated at the error check component 324 with the one received as a part of the TLP. If the two codes or hashes do not match the NAK component 326 is notified and the corresponding sequence number for the bad packet or payload is determined. The transmitter device 310 may be notified via a NAK signal over the error code line 211 or be notified of the dropped sequence number via the sequence line 213 of a corresponding transmitter associated with or connected with the receiving device 320. Likewise, the device hosting the transmitting device 310 may have a corresponding receiving device to receive the NAK signal and inform the transmitting device 310.

If the payload and header are verified by the error check component 324, then the receive buffer 328 will receive the payload according to the sequence of the sequence numbers in the header of the TLP. This payload may then be transmitted or provided to the payload disassembly component 322 which may unpack the flits and order them for transmission back over a flit-based network via first and second outputs 215 and 217. Thus, while some protocol translation occurs in order to provide sequential flit transmission over PCIe, the costly translation of flits to comply with the PCIe message format of the protocol layer is avoided. As a result, the transmitted packets are not fully PCIe compliant and may not be read or understood by a PCIe compliant device.

In FIG. 4A a conventional transaction layer packet (TLP) is illustrated with a header 402, a CRC 406, and a payload of payload messages 404 that each conform to PCIe protocol layer message type standards. In FIG. 4B, the three main components of the TLP are retained with header 402, a payload 408, and a CRC 406. In this case, however, the TLP 400 has a payload portion made up of or filled with data blocks 52, 54, 56 and 58 which do not conform to the PCIe protocol layer and may instead be flits. The header 402 may be a framing token or symbol (STP) with a beginning and ending TLP lengths 40 and 42, a FCRC, a type code, the sequence number 44, and other framing information for the TLP. The CRC 406 may be a redundancy code block that complies with PCIe TLP standards or may be other data checks including parity bits, hashes, or the like. The final data block 58 may be a tail flit.

The data blocks of payload 408 may include flits and, in particular, a head flit 52, for example. The head flit 52 may include routing information and flags to establish connections for the other data flits 54, 56, and 58 of the payload 408 once disassembled at the receiver. The data blocks 52, 54, 56, and 58 may be ordered according to an ordering received at inputs 203 and 205 of the flit-based interface, or another order as determined by the buffer 304. The payload 408 may include all flits received within one cycle, or all flits received during one assertion of a flag, or all flits received via one virtual connection of the flit interface. The modified TLP may provide sequential flit-based communication over PCIe interfaces of an agent-to-agent interconnect fabric 101.

Figure 5:
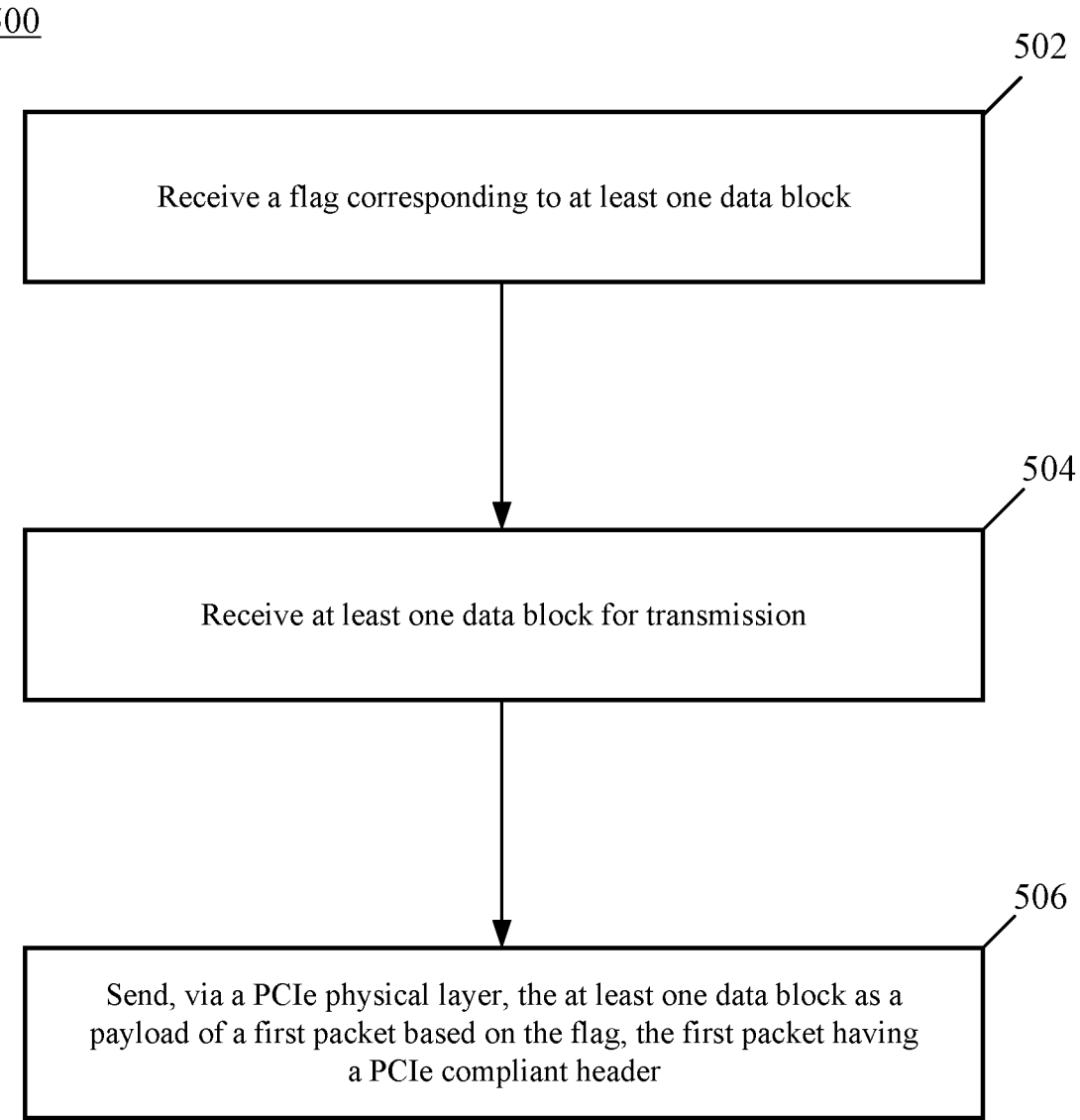
FIG. 5 is a flow diagram of a process according to an implementation.

In FIG. 5 a process 500 illustrates elements of a packaging process to receive data blocks and combine them into a payload of a PCIe TLP. At 502, the process 500 may receive a flag or monitor/check a flag corresponding to the at least one data block. The flag may be received at first input 203 of a receiver device and may be a flit valid flag. At 504, the process 500 may receive at least one data block for transmission in a TLP. The data block may be a flit and a first block received may be a head flit. The process 500 may also check or monitor the flag upon the receipt of each data block or periodically (e.g., at the end of a cycle) to appropriately build the payload. Indeed, process 500 may be executed or performed by hardware, software, or a combination thereof in a transmitter device 310.

At 506, the process 500 may send, via a PCIe physical layer, the at least one data block as a payload of a packet based on the flag where packet has a PCIe compliant header. That is, the PCIe compliant header complies with the data link layer and transaction layers of the PCIe interface standard. The rest of the packet may not comply with PCIe. The payload of the packet may include flits from one or more cycles of a virtual routing connection. The flag may define the routing cycle. The first block of the at least one data block of the payload may be a head flit, the head flit defining a routing path and setting the flag to valid. One or more subsequent blocks of the at least one data block of the payload may be a data flit, the first block and the subsequent blocks being sent in the payload. Upon decoding at a receiver, the head flit of the first block defines an output flag of a flit-based interface of the receiver.

The process 500 may scale the size of the payload based on a latency requirement of the hardware component (e.g., first processor 102), the SoC 100, or the transmitter device 310. That is, the data blocks or flits received within a predetermined time period are inserted into the payload and then transmitted at the termination of the predetermined time period. The size of the payload may also be determined by a length of time that the virtual routing connection of the flit interface remains open, and the data flits received in that length of time. Upon the flag being de-asserted, assembly of the payload of the first packet by the payload assembly 302 or the buffer 304 may be finished or terminated. The size of the payload may also be determined by a cycle defined by the flag of the flit interface or a predetermined number of cycles, where flits or data blocks received during the one or more cycles are combined into a single payload.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

The invention claimed is:

1. A method for transmitting data through a hardware Peripheral Component Interconnect Express (PCIe) interface, the method comprising:
   receiving at least one data block for transmission; and
   sending, via a PCIe-compliant physical layer and PCIe-compliant data link layer, the at least one data block as a payload of a first packet, wherein the first packet header comprises a PCIe compliant header and wherein the first packet payload comprises a non-PCIe-compliant payload.

2. The method of claim 1, wherein the at least one data block is received via a non-PCIe interface.

3. The method of claim 1, wherein receiving the at least one data block for transmission comprises receiving one or more data blocks and adding them to the payload until the payload reaches a predetermined size or until a routing cycle for receiving data blocks and adding them to the payload has expired.

4. The method of claim 1, wherein the at least one data block is a flow control unit (flit) and wherein the non-PCIe-compliant payload comprises a flit-based payload.

5. The method of claim 1, wherein the first packet has a tail block including a cyclic redundancy check (CRC).

6. The method of claim 1, wherein a first block of the at least one data block is a head flit, the head flit defining a routing path, and
   wherein at least one subsequent block of the at least one data block is a data flit, the first block and the at least one subsequent block being sent in the payload.

7. The method of claim 6, wherein, upon decoding at a receiver, the head flit of the first block defines an output flag of the receiver.

8. The method of claim 3, further comprising:
   determining a size of the payload of the first packet based on a latency requirement,
   defining a duration of time for the routing cycle, and
   wherein, sending the at least one data block as a payload of a first packet comprises sending a portion of the received data blocks of the at least one data block that are received during the routing cycle based on the size of the payload, the duration of time for the routing cycle, or a combination thereof.

9. The method of claim 3, comprising determining that the routing cycle has begun comprises detecting assertion of a valid flag or valid signal, and wherein determining that the routing cycle has expired comprises detecting de-assertion of the valid flag or valid signal.

10. The method of claim 1, wherein the at least one data block is a flit, and the payload is made up of only flits.

11. A device for transmitting data via a Peripheral Component Interconnect Express (PCIe) interface, the device comprising:

a first input port receiving at least one data block; and
   at least four output lines that provide a PCIe-compliant physical layer and PCIe-compliant data link layer connection,
   wherein the device sends, via the at least four output lines, the at least one data block as a payload of a first packet, wherein the first packet header comprises a PCIe compliant header, and wherein the first packet payload comprises a non-PCIe-compliant payload.

12. The device of claim 11, wherein the at least one data block is received via a non-PCIe interface.

13. The device of claim 11, wherein receiving the at least one data block for transmission comprises receiving one or more data blocks and adding them to the payload until the payload reaches a predetermined size or until a routing cycle for receiving data blocks and adding them to the payload has expired.

14. The device of claim 11, wherein the at least one data block received via the first input is a flow control unit (flit) and wherein the non-PCIe-compliant payload comprises a flit-based payload.

15. The device of claim 11, wherein the first packet has a tail block including a cyclic redundancy check (CRC).

16. The device of claim 11, wherein a first block of the at least one data block is a head flit, the head flit defining a routing path for the at least one data block,
   wherein at least one subsequent block of the at least one data block is a data flit, the first block and the at least one subsequent block being sent in the payload.

17. The device of claim 16, wherein, upon decoding at a receiver, the head flit of the first block defines an output flag output from the receiver.

18. The device of claim 13, wherein the device determines a size of the payload of the first packet based on a latency requirement,
   wherein the device defines a duration of time for the routing cycle, and
   wherein, to send the at least one block as a payload of the first packet, the device sends, as the payload, a portion of the received data blocks of the at least one data block that are received during the routing cycle based on the size of the payload, the duration of time for the routing cycle, or a combination thereof.

19. The device of claim 13, wherein the device determines that the routing cycle has begun by detecting assertion of a valid flag or valid signal, and determines that the routing cycle has expired by detecting de-assertion of the valid flag or valid signal.

20. The device of claim 11, wherein the at least one data block is a flit, and the payload is made up of only flits.

* * * * *